No. 641,734. Patented Jan. 23, 1900.
F. F. SLOCOMB.
LEATHER FINISHING MACHINE.
(Application filed Aug. 11, 1898.)

(No Model.) 6 Sheets—Sheet 1.

Fig.1.

WITNESSES:
John A. Rennie
O. F. Naegle

INVENTOR
Frank F. Slocomb
BY
Wiedersheim & Fairbanks
ATTORNEYS.

THE NORRIS PETERS CO., PHOTO-LITHO., WASHINGTON, D. C.

No. 641,734. Patented Jan. 23, 1900.
F. F. SLOCOMB.
LEATHER FINISHING MACHINE.
(Application filed Aug. 11, 1898.)

(No Model.) 6 Sheets—Sheet 2.

WITNESSES:
John A. Rennie
P. F. Nagles

INVENTOR
Frank F. Slocomb.
BY Diederstein & Fairbanks
ATTORNEYS.

No. 641,734. Patented Jan. 23, 1900.
F. F. SLOCOMB.
LEATHER FINISHING MACHINE.
(Application filed Aug. 11, 1898.)
(No Model.) 6 Sheets—Sheet 4.

WITNESSES:
John A. Rennie
P. F. Eagles

INVENTOR
Frank F. Slocomb
BY Biedersheim & Fairbanks
ATTORNEYS.

No. 641,734. Patented Jan. 23, 1900.
F. F. SLOCOMB.
LEATHER FINISHING MACHINE.
(Application filed Aug. 11, 1898.)

(No Model.) 6 Sheets—Sheet 6.

Fig. 15.

UNITED STATES PATENT OFFICE.

FRANK F. SLOCOMB, OF WILMINGTON, DELAWARE.

LEATHER-FINISHING MACHINE.

SPECIFICATION forming part of Letters Patent No. 641,734, dated January 23, 1900.

Application filed August 11, 1898. Serial No. 688,358. (No model.)

*To all whom it may concern:*

Be it known that I, FRANK F. SLOCOMB, a citizen of the United States, residing at Wilmington, in the county of New Castle, State of Delaware, have invented a new and useful Improvement in Leather-Finishing Machines, which improvement is fully set forth in the following specification and accompanying drawings.

My invention consists of an improved construction of leather-finishing machine, in which I employ a cylinder having knives mounted thereon and provided with a forward inclination, said knives being helically disposed, axially supported, and carried upon bent or angular fingers, so that they will be held at a forward inclination to the axis of the cylinder.

It also consists of a novel construction of pressure-apron and means for imparting a longitudinal curvature to the same.

It also consists of a supplemental knife or roll adjustably supported and adapted, as may be required, either to supplement or to limit the action of the cylinder-knives upon the leather to be treated.

It also consists of means for imparting a longitudinal curvature to the pressure-apron or carrier employed and a frictional brake for holding the same in any desired position automatically.

It further consists of novel details of construction, all as will be hereinafter more fully set forth, and particularly pointed out in the claims.

Fig. 5 represents, on a reduced scale, a side elevation of a roll or cylinder in detached position and having mounted thereupon helically-disposed knives or disks, showing the relative position of the same. Fig. 6 represents a side elevation of one of the knives, showing also the supporting finger or device therefor. Fig. 7 represents a front elevation of Fig. 6. Fig. 8 represents a plan view of a portion of a pressure-apron employed. Fig. 9 represents a side elevation, partly in section, of a cushioned supplemental knife and its adjuncts employed in conjunction with the cylinder-knives. Fig. 10 represents a plan view of a portion of the supplemental knife and its adjuncts. Fig. 11 represents a plan view of a cushioned roller which may be employed in place of the knife seen in Fig. 10.

Similar letters and numerals of reference indicate corresponding parts in the figures.

Referring to the drawings, 1 designates a shaft mounted in suitable bearings and carrying the tight and loose pulleys 2 and 3, respectively, and also the pinion 4, which latter meshes with the gear 5, mounted on the shaft 6, which also revolves in suitable bearings.

7 designates a pinion carried by said shaft, said pinion meshing with the gear 8, which is mounted on the shaft 9, the latter revolving in bearings in the housing 10, said shaft having mounted thereupon, so as to rotate in unison therewith, the drum or cylinder 11, within which an end of the skin or leather 12 is adapted to be received, as will be hereinafter explained.

13 designates a stationary jaw which extends longitudinally of the drum 11, which latter is provided with the longitudinally-extending opening 14, within which plays the movable jaw 15, which is mounted upon the arms 16, which latter are carried by the shaft 17, supported by the arms 17', which latter are secured to the shaft 9, said shaft 17 having the rock-arms 18 thereon, said rock-arms being two in number and having mounted thereon the rollers 19, which travel upon the stationary cams 20, the latter being conveniently secured to the framework of the machine and having the portion 21, which is substantially concentric to the shaft 9, while the portion 22 of said cam is flattened and provided with the inclined face 23, by means of which the closing of the jaws 13 and 15 is effected.

24 designates a curved guide or cam which is suitably attached to the framework or housing 10 and is located oppositely to the portions 22 and 23 of the cam 20, it being obvious that the roller 19 will travel between said cam 24 and the cam-faces 22 and 23, as will be explained, said cam 24 serving to prevent said roller from improper disengagement from said cam-faces.

25 designates a roll or cylinder which is mounted in the upper portion of the machine and is rotated by means of the pulley 26, power being applied thereto from a different source than the pulleys 2 and 3, whereby it will be apparent that the cylinder 25 and its adjuncts can be rotated independently and at different speeds without changing the speed of the drum 11.

27 designates knives which are mounted on the cylinder 25, said knives consisting of the circular or dish-shaped plates 28, which have their periphery serving as a cutting edge and having a substantially central opening therethrough through which passes a bolt or other fastening device 29, the same passing through the finger 30, which has the threaded stem 31 offset or projecting at an angle thereto, said stem having the nut 32 mounted thereupon and serving as a lock-nut, whereby the longitudinal angle or inclination of the knives 27 to the axis of the cylinder 25 can be varied, as will be hereinafter explained.

The preferred manner of arranging the knives upon the cylinder 25 will be understood from Fig. 5, in which two oppositely or helically inclined rows 33 and 34 are employed, it being evident that by the insertion of the threaded stems 31 into spirally or helically arranged tap-holes in the cylinder 25 a very delicate adjustment of the knives 28 can be attained, since said knives can be turned axially, and the relative position thereof to the cylinder upon which they are mounted will be assured by means of the nuts 32.

At substantially the central portion of the cylinder 25 I place the curved or dish-shaped knife 35, which latter is concaved to such an extent that its curvature corresponds to the general contour of the helically-arranged knives at the right or left thereof, as I have indicated at $a$ and $b$. The contour of this dish-shaped knife 35 can be attained by clamping a thin metallic disk upon a concave socket in a plate $35^\times$, supported by the bolt or other fastening device 29, whereby the dished or concaved shape is imparted to said knife, as indicated at 35 in Fig. 15.

Figure 15:
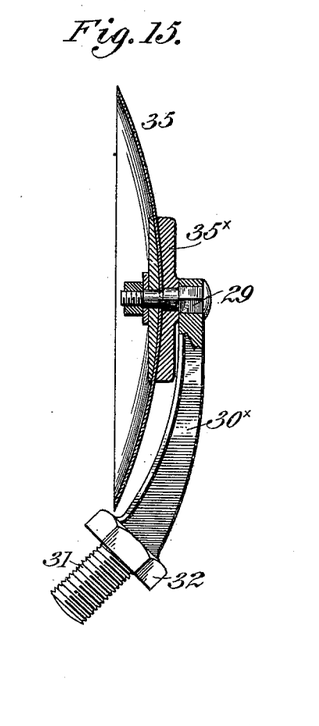
Fig. 15 represents a partial side elevation and partial vertical section of certain detached portions of the machine on an enlarged scale.

The finger $30^\times$ seen in Fig. 15 is substantially the same as the fingers 30 seen in the other figures, the only difference being that said finger $30^\times$ is curved instead of rectilinear, as in Fig. 6.

36 designates a portion of the housing of the machine at either end thereof, within which are the openings 37, wherein are located the rings or collars 38, which latter are supported upon the threaded stems 39, the same being three in number in the present instance and provided with lock-nuts, whereupon it will be evident that by the manipulation of said stems 39 said rings or collars 38 can be adjusted eccentrically to the portion 36 of the housing of the machine, or, in other words, can be moved at will toward or from the cylinder 25 and the helically-arranged knives mounted thereupon.

40 designates the extremities of an upper strip 41, which latter is attached to the angle-irons or brackets $41^\times$, the latter having attached to their other extremities the lower strip 42, it being noted that said extremities 40 are each seated in disks or plates $40^\times$, which latter are rotatably mounted in the collars 38, and consequently serve as journals for the frame 44, formed by the upper and lower strips 41 and 42 and the brackets $41^\times$, said strips being of any suitable material possessing the requisite strength and resiliency.

43 designates a resilient band, strip, or apron which passes along the back of the upper and lower strips 41 and 42, said apron being preferably endless and hereinafter termed a "pressure-apron," the operation of which will be explained. This pressure-apron is opposed to the helically-arranged knives in a plane practically parallel with the axis thereof, the opposing portions of said knives and pressure-apron being along a line parallel with the axis of the knife-cylinder and in the cylindrical plane through which the outer edges of the knives pass when closest to the pressure-apron. When the pressure-apron is curved longitudinally, the distance between the opposing portions of said helically-arranged knives and the said apron at the ends of the apron and said knife-cylinder is greater than the distance between such opposing portions between the ends thereof, so that the knives, being on a line parallel with the axis of the cylinder, will act to a greater extent on the material situated opposite a point midway between the ends of the knife-cylinder than upon the material at the ends thereof.

45 designates a cord or other connection having one end attached to the lower portion of the brackets $41^\times$ or other suitable point and passing over the guide-sheaves 46, 47, and 48 and being connected to the treadle 49, wherefrom it will be seen that a depression or elevation of the treadle will cause a corresponding movement to be imparted to the pressure-apron 43.

The means employed for imparting a longitudinal curvature or convexity to the pressure-apron 44 will be best understood from Fig. 8, in which 50 designates a rod passing through the flanges of the brackets or angle-irons 41×, said rod having the threaded end 51 and being provided with a hand-wheel 52, whereupon it will be seen that by the rotation of the latter the brackets 41× may be brought toward or away from each other.

I employ a brake for holding the apron in its curved position, and in the instance illustrated 53 designates a collar mounted upon the rod 50 on the extremity opposite to the hand-wheel 52, said collar having an inclined or cam face 54, which is adapted to act in conjunction with the cam-face 55 upon the head 56, which is movably mounted on the rod 50, said head being actuated by means of the lever 57.

By manipulating the handle 57 the cam-faces of the collar 53 and head 56 cause the brackets 41× of the frame 44 to be moved toward and away from each other to vary the curvature or convexity of the pressure-aprons to suit the requirements of the skin under treatment. It is seen that the extremities 40 of the upper strip 41 have sliding connections with the disks or plates 40×, so that they can reciprocate relative thereto as the brackets 41× are moved toward and away from each other by the hand-wheel 52 or the handle 57.

58 designates a strip extending transversely of the machine and having attached thereto (in the present instance at the under side thereof) the transversely-extending knife 59, said strip carrying at either end thereof a rod 60, which has the washers 61 mounted thereupon, said rod passing through the members 62 of the brackets or angle-irons 63, which latter are attached to the framework of the machine.

The proper position of the strip 58 and the knife 59 carried thereupon is assured by means of the spring 64, which has one end in contact with the washers 61, while its other end abuts against the portion 62 of said bracket, it being noticed that the tension of said spring, and consequently the relative position of the knife 59, can be adjusted by manipulating the nuts 65, carried by the rods 60.

Figure 1:
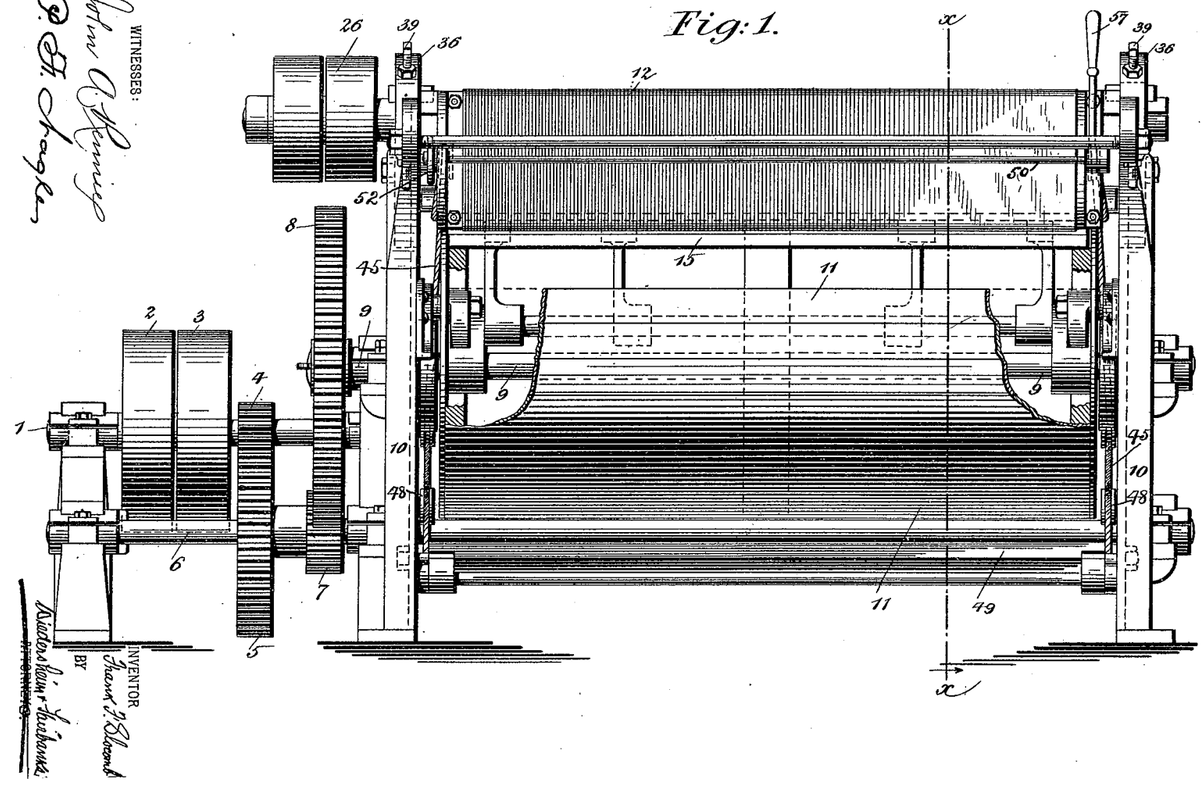
Figure 1 represents a front elevation, partly broken away, of a leather-finishing machine embodying my invention.
Figure 2:
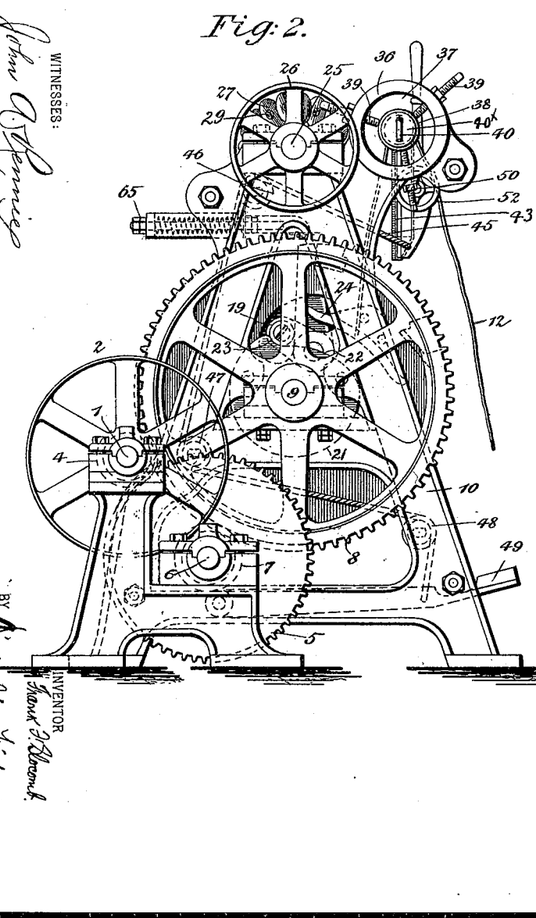
Fig. 2 represents an end elevation of Fig. 1.
Figure 3:
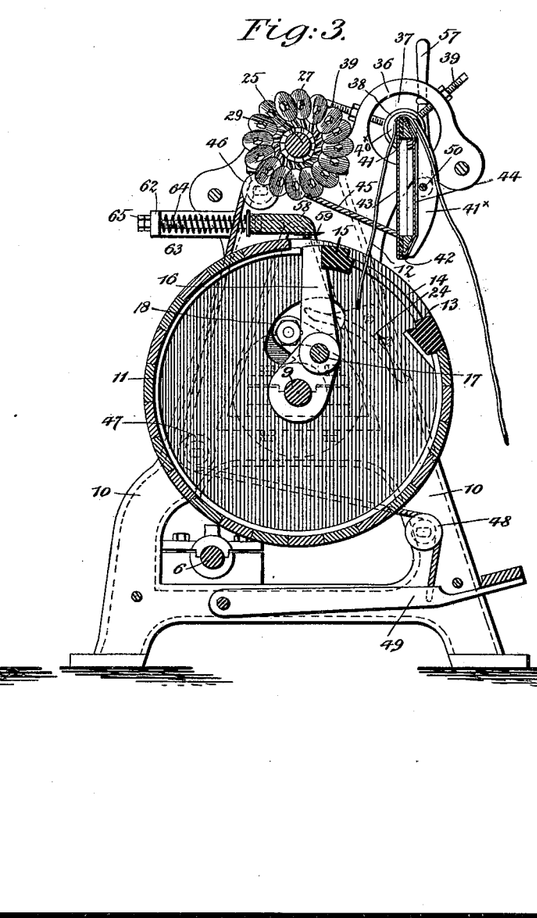
Fig. 3 represents a sectional view of the machine, the section being taken on line $x$ $x$, Fig. 1.
Figure 4:
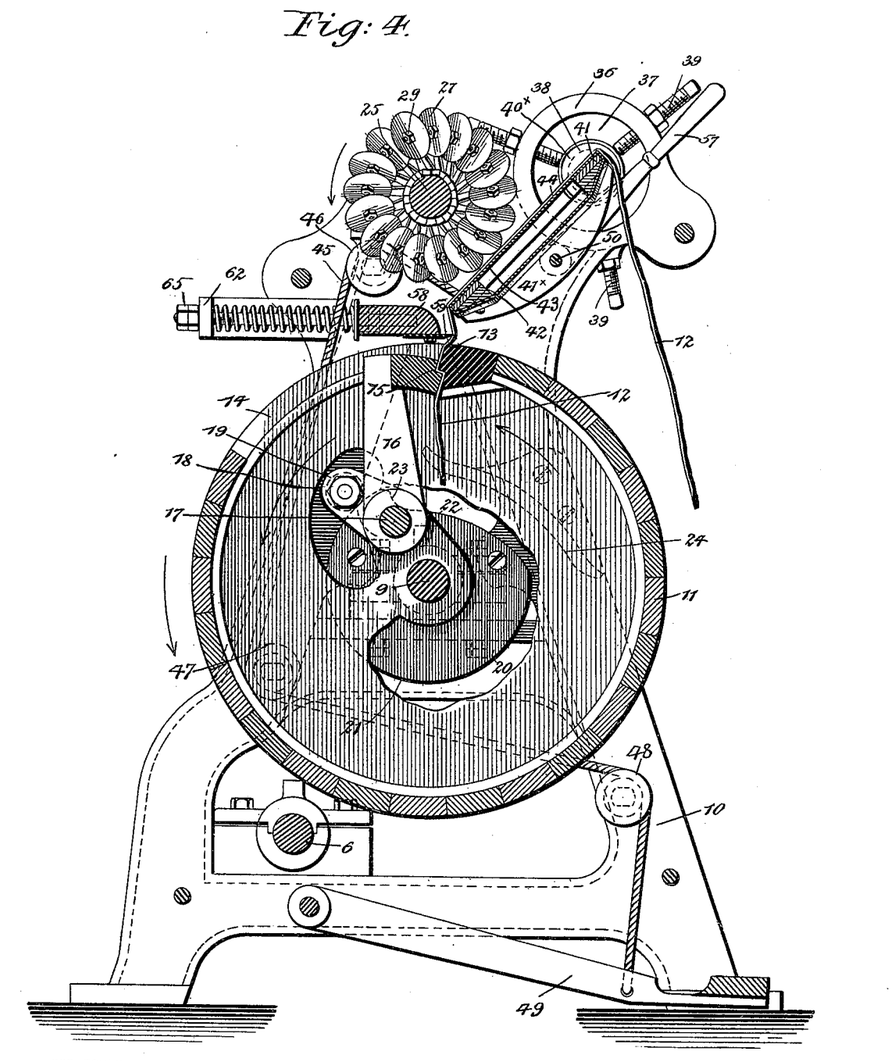
Fig. 4 represents, on an enlarged scale, a sectional view somewhat similar to Fig. 3, but showing the clamping device in operative position and the means for operating the same, the pressure-apron being also shown as moved from the position seen in Fig. 3.

In place of the supplemental knife 59 I may employ in some instances, where the use of such a knife is not essential, a roller 60×, which latter is mounted upon similar cushions or yielding supports and occupies substantially the same position with respect to the pressure-apron and the cylinder and knives as does the knife 59, as seen in Figs. 3 and 4, said roller being used in such cases, as it is not necessary or expedient for the knife 59 to be employed.

Figures 12, 13, 14:
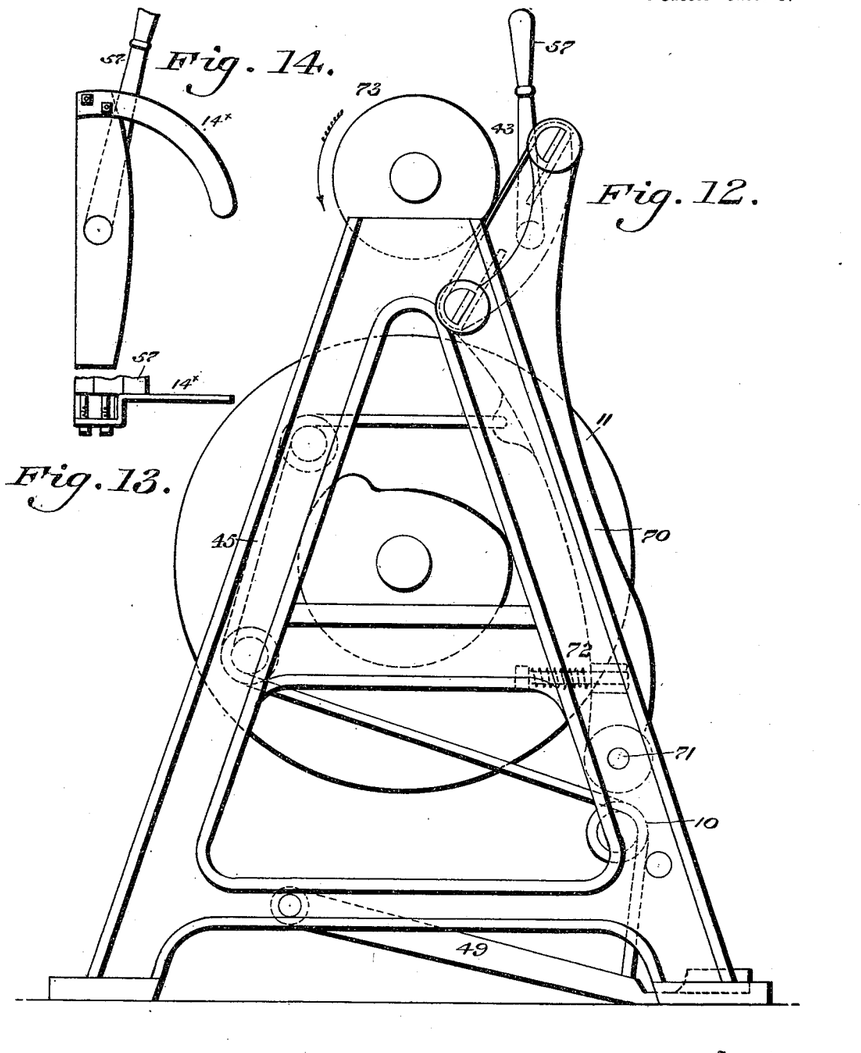
Fig. 12 represents a side elevation showing a modified construction of means for supporting and actuating the apron.
Figs. 13 and 14 represent plan and side elevations of a frictional spring for holding a lever in position.

In the construction seen in Fig. 12 I show a modified manner of supporting and actuating the endless pressure-apron 43, in which 70 designates an arm or lever which is fulcrumed at 71 to any suitable portion of the housing 10, said arm having attached to the upper portion thereof an apron 43, as already described, said apron being supported so as to be normally inclined at an angle, substantially as indicated in Fig. 12, said apron being tightened and manipulated by means of the lever 57, substantially in the manner hereinbefore described in detail. A cord or connection 45 passes over the guide-sheaves and is operated by means of the treadle 49, as has already been described, while the proper normal position of the apron is assured by means of the spring 72, the function of which is to raise the treadle and move the apron back away from the knives.

73 designates the outer periphery of the circle of knives 27 and shows the relative position of the path of the same when revolving to the endless apron 43.

I have found in some instances that the blast of air created by the rapidly-revolving knives 27 is so great, since the same revolve in the direction of the arrow shown in Fig. 12, that the extremity of the skin or leather which is being treated is liable to be blown upwardly, and thus out of engagement with the jaws 13 and 15; but by the construction seen in Fig. 12, in which the apron is moved bodily toward and away from the knives instead of being pivotally suspended, as seen in Figs. 1 to 4, inclusive, I obtain better results and am enabled to regulate the pressure of the apron upon the revolving knives with great exactness, and it will furthermore be apparent that the skins can be placed in position endwise of the machine.

The operation is as follows: The parts normally appear as seen in Fig. 3, the leather to be treated being thrown up over the upper portion of the pressure-apron 44, so that one extremity thereof will fall into the opening 14, so as to be gripped between jaws 13 and 15, it being understood that the drum 11 rotates to the left, as indicated by the arrow in Figs. 3 and 4, and it will be apparent that by following out the arrangement of the cams and their adjuncts such movement of such drum will cause the jaw 13 to approach the jaw 15, whereupon the jaws will assume the position seen in Fig. 4, the leather 12 being tightly clamped therebetween. It will of course be understood that any suitable mechanism may be employed for closing the jaws 13 and 15, and as the same *per se* forms no part of my invention I have not deemed it necessary to describe in detail the specific manner in which said cams are operated, and it will furthermore be evident that any construction of mechanism which accomplishes the automatic opening or closing of the jaws 13 and 15 may be employed. The operator next depresses the treadle 49, so that the pressure-apron carrying the leather therewith is brought into substantially the position seen in Fig. 4, it being evident that as the drum 11 continues its rotation from the right to the left the leather 12 will be drawn therewith and every portion thereof will be subjected to the action of the rows 33 and 34 of the helically-arranged knives 27.

Owing to the variation in size, weight, and texture of skins to be treated and because most skins require more work or pressure down the center or back and in some cases very little on the flanks or edges, where the substance is lighter and less firm, it is desirable that the operator shall be able to adapt the pressure on any part of a skin to its requirements, so that any one skilled in the art may by proper variation or gradation of the pressure cause the skin as a whole to be worked uniformly. To this end I employ the device hereinbefore described and best shown in Fig. 8 to impart a bow shape or longitudinal curvature to the pressure-apron and carrier, and it will be apparent that by the manipulation of the hand-wheel 52 and the lever 57 any desired amount of longitudinal curvature or convexity can be imparted to the pressure apron and the same will be held in desired position when released by the operator.

The office of the knife 59 is either to supplement or limit the action of the cylinder-knives 27 upon the leather which is being treated, the effect of which will be evident from Fig. 4, and it will also be apparent that the roller 60$^\times$ may be substituted in place of the supplemental knife 59 when desired. The tension of the knife 59 can be regulated with great exactness by the manipulation of the nut 65, and by the employment of the treadle 49 the relative position of the pressure-apron to the cylinder-knives can be adjusted with great exactness.

The function of the spring 14$^\times$ (seen in Figs. 13 and 14) is to bear upon the lever 57 in all the positions it may assume, and thus hold said lever in position by frictional contact.

Having thus described my invention, what I claim as new, and desire to secure by Letters Patent, is—

1. In a leather-finishing machine, the combination with helically-arranged knives, of an opposing pressure-apron, the distance between the opposing portions of said apron and knives at the ends thereof being greater than at the central portion of the same.

2. In a leather-finishing machine, the combination with helically-arranged knives, of an opposing pressure-apron, the distance between the opposing portions of said apron and knives at the ends thereof being greater than at the central portion of the same, and means for varying the relative distance between the knives and the aprons at different points throughout their opposing portions.

3. In a leather-finishing machine, the combination with the helically-arranged knives, of a flexible opposing pressure-apron, and means for imparting a longitudinal curvature to the portion of said apron that is opposed to said knives, whereby the ends of said apron are farther from said knives than the central portion thereof.

4. In a leather-finishing machine, a cylinder having a plurality of helically-disposed knives mounted thereon, said knives being inclined or pitched relative to said cylinder, and means for adjusting the direction of inclination or pitch of said knives without varying the angle thereof.

5. In a leather-finishing machine, a rotatable cylinder having a plurality of axially-pivoted circular knives or disks, said knives or disks being arranged so as to provide a helical cutting device.

6. In a leather-finishing machine, a rotatable cylinder having a plurality of axially-pivoted circular knives or disks, said knives being helically disposed throughout said cylinder with the sides of adjacent knives overlapping.

7. In a leather-finishing machine, the combination of a cylinder having circular knives or disks, said knives or disks being axially supported upon the ends of fingers having angular stems by which they are secured to the cylinder, said stems being secured within radial openings in said cylinder to give a pitch or inclination to the finger and knife or disk.

8. In a leather-finishing machine, the combination of the knives, a swinging pressure-apron pivotally supported, and means for adjusting the pivot of said apron to vary and regulate the distance between said pivot and said knives.

9. In a leather-finishing machine, a pressure-apron or carrier, means for imparting a longitudinal curvature to the same and a brake for holding said apron in any desired position when released by the operator.

10. In a leather-finishing machine, a cylinder, knives mounted thereon, a pressure-apron adapted to engage with said knives, a knife adjustably supported and adapted to supplement the effect of the cylinder-knives and to determine the action of said knives on the work after the latter has passed beyond the pressure-apron, and a rotary drum provided with means for gripping the leather or skin to be treated.

11. In a leather-finishing machine, a cylinder, knives mounted thereon, a pressure-apron adapted to engage with said knives, means for controlling the motion of the same, a rotary drum having an opening to receive one end of the leather or skin to be worked and provided with an automatic clamp operating within said drum, and a knife adapted to contact with the skin or leather to be worked between its point of connection with said drum and the said knives.

12. In a leather-finishing machine, a cylinder, knives mounted thereon, a pressure-apron or carrier adapted to engage with said knives, means for controlling the motion of the latter, a rotary drum provided with an automatic clamp and an adjustably-supported and cushioned knife adapted to contact with the skin or leather to be worked.

13. In a leather-finishing machine, the helically-arranged knives, and opposing pressure-apron, means for imparting a longitudinal curvature to the opposing portion thereof, a lever upon which said apron is supported, so as to be moved bodily therewith, and means for actuating said lever.

FRANK F. SLOCOMB.

Witnesses:
JACOB KNOBELAUCH,
THOMAS S. GATES.